Patented Apr. 27, 1937

2,078,582

UNITED STATES PATENT OFFICE 2,078,582

CYCLIC PROCESS OF PRODUCING AMINES OF UNSATURATED HYDROCARBONS

Morris S. Nafash, Union City, N. J., assignor to Cesare Barbieri, New York, N. Y.

No Drawing. Application November 1, 1933, Serial No. 696,152

6 Claims. (Cl. 260—127)

The present invention relates to a process of producing amines, and more particularly, to a cyclic process of producing amines including chlorination as one of the steps thereof.

It is an object of the present invention to provide a process of producing amines which can be carried into practice with the use of unsaturated hydrocarbons, such as olefines, as raw materials.

It is another object of the invention to provide a process of producing amines involving the recovery and reuse of the halide salt produced in the decomposition of the amine hydrohalide and the chlorination of the halide salt whereby a cyclic procedure may be effected.

It is within the contemplation of the invention to provide a cyclic process of producing amines which is practical and satisfactory and which is capable of being conducted on an industrial scale with relatively simple apparatus and equipment and with relatively inexpensive raw materials.

Other objects and advantages of the present invention will become apparent from the following description of a preferred procedure of carrying it into practice.

An aryl or alkyl polyhalide is reacted with ammonia under the influence of heat and pressure to form an amine polyhydrohalide. In practice it has been found to be preferable to use a bromide or a mixed bromide and chloride. For instance, in a particular case, ethylene dibromide was used in the production of ethylene diamine.

In reacting a halide or mixed halide with ammonia, it is preferred to bring the halide and ammonia together in the vapor phase. Thus, a pool of ammonia liquor is established in a vessel which can be heated and which preferably is provided with a jacket for steam. By heating ammonia liquor of say about 19% strength to a temperature of about 160° C., the space in the reaction vessel above the pool is filled with ammonia vapor. When the halide such as ethylene dihalide is introduced into the heated reaction space, it is converted into a vapor. Of course, the halide could be vaporized and/or pre-heated outside of the reaction vessel and then introduced as a vapor. The vapors react under heat, say at a temperature of about 180° C. and form a polyamine hydrohalide, such as ethylene diamine hydrobromide which is a solid.

After the formation of the solid polyamine hydrohalide, the particles thereof fall into the pool of ammonia liquor. When a sufficient amount of product has collected in said liquor, the mass of ammonia liquor and suspended particles is withdrawn from the vessel as a slush.

For the purpose of freeing the amine, the solid hydrohalide is caused to react with caustic soda. For instance in the case of ethylene diamine hydrobromide, it is reacted with sodium hydroxide to form ethylene diamine and sodium bromide. The sodium bromide dissolves to form an unsaturated solution and then on concentration precipitates as a solid. In the event that any other halide, such as a chloride, is used, it is recovered in the same manner as the bromide. Of course, mixed halides, such as bromide and chloride, may be employed. The liberated polyamine may be isolated by subjecting the liquor to distillation and by condensing the evolved vapor. The residual liquor remaining after distillation carries the halides, impurities and the like.

In regard to the residual liquor, it is to be noted that sodium bromide or other halides or mixtures could not be recovered and used in the customary methods due to the presence of impurities and organic substances. Attempts to isolate and separate crystals of sodium bromide of commercial purity proved to be too expensive and impractical. I have discovered that the halogen of the sodium bromide is rendered available for re-use by dissolving the salts in the minimum amount of water permissible and passing chlorine gas into the solution. At the point of introduction of the chlorine gas, a substitution is made of sodium chloride for sodium bromide and bromine set free. It was unexpectedly found that continued introduction of the chlorine gas not only freed the bromine from the sodium bromide but accomplished something more. The continued bubbling of the chlorine gas through the bromine in the supernatant liquor apparently accomplished the solution of the bromine. A hypothetical explanation may be that some combination of bromine and chlorine may possibly be formed which goes completely into solution. Actual tests have been made demonstrating the fact that bromine alone and chlorine alone have a different solubility in their saturated salt solution and that solubility in either case is about 4%. Indications from the tests make it appear that practically all of the bromine goes into solution. In fact, 40 parts by weight of bromine when treated with chlorine will go into solution in a saturated sodium chloride solution of 75 parts.

When the bromine was liberated, I introduced ethylene gas into the solution and ethylene dibromide was formed at once. On weighing the product it appeared that ethylene dichloride was also formed. As close as can be estimated a recovery of practically all of the bromine as well as much of the chlorine was effected, thus obtaining a yield of halogenated hydrocarbons based on the bromine content of 116% of theoretical which means that a large part of the chlorine plays an active rôle.

The alkyl or aryl polyhalide, such as ethylene dibromide or ethylene chlorbromide, which is formed can be recycled and re-used to form an amine hydrohalide with ammonia in the reaction vessel. The formation of ethylene dibromide or mixed halides in the chlorination reaction is preferably conducted in the cold, say at temperatures of about 0° C. to about 4° C. Instead of ethylene dibromide or chlorbromide, propylene or butylene dibromide or chlorbromide or an olefinic dibromide or chlorbromide (alkylene or alkenyl dihalide) may be used.

The equations involved in the foregoing reactions are as follows:—

$$C_2H_4Br_2 + NH_3 = C_2H_4(NH_2)_2 \cdot 2HBr$$

$$C_2H_4(NH_2)_2 \cdot 2HBr + 2NaOH = C_2H_4(NH_2)_2 + 2NaBr + 2H_2O$$

$$NaBr + Cl = NaCl + Br$$

$$Br + Cl = Br.Cl$$

$$2C_2H_4 + 2BrCl = C_2H_4Br_2 + C_2H_4Cl_2$$

or

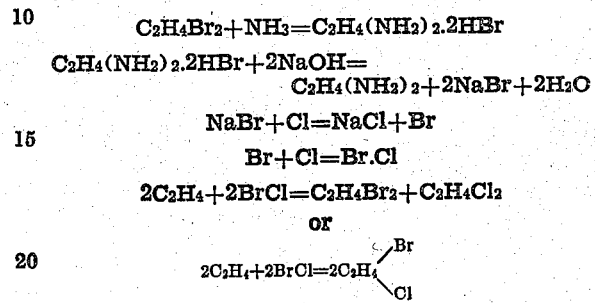

I claim:—

1. The cyclic process of producing alkylene diamines which comprises reacting an alkylene dibromide with ammonia to form a solid alkylene diamine hydrobromide, removing said solid diamine hydrobromide, treating said solid diamine hydrobromide with caustic soda in solution to free the diamine and to form bromide of sodium, distilling diamine from the solution containing said bromide of sodium, bringing the solution containing said bromide of sodium into reaction contact with chlorine gas to liberate bromine and to form chloride of sodium, introducing an unsaturated aliphatic straight chain hydrocarbon into said solution containing said liberated bromine to produce an alkylene dibromide containing the same number of carbon atoms as is in the diamine produced in the first step hereof, and recovering and recycling said dibromide to the first step for re-use in the formation of further amounts of solid alkylene diamine hydrobromide.

2. The cyclic process of producing ethylene diamines which comprises reacting ethylene dibromide with ammonia to form solid ethylene diamine hydrobromide, removing said solid diamine hydrobromide, treating said solid diamine hydrobromide with caustic soda in solution to free the diamine and to form bromide of sodium, distilling the aforesaid to liberate diamines, bringing the solution containing the aforesaid bromide of sodium into reaction contact with chlorine gas to liberate bromine and to form chloride of sodium, introducing a hydrocarbon vapor containing ethylene into said solution containing said liberated bromine to produce ethylene dibromide, and recovering and recycling said dibromide to the first step for re-use in the formation of further amounts of solid ethylene diamine hydrobromide.

3. The cyclic process of producing alkylene diamines which comprises reacting an alkylene dibromide with ammonia to form a solid alkylene diamine hydrobromide, maintaining a temperature of about 160° C., removing said solid diamine hydrobromide, treating said solid diamine hydrobromide with caustic soda in solution to free the diamine and to form bromide of sodium, distilling the aforesaid to liberate the diamines, bringing the solution containing said bromide of sodium into reaction contact with chlorine gas to liberate bromine and to form chloride of sodium, introducing an unsaturated aliphatic straight chain hydrocarbon vapor into said solution containing said liberated bromine to produce a dibromide of an alkylene hydrocarbon containing the same number of carbon atoms as is in the diamine produced in the first step hereof, and recovering and recycling said alkylene dibromide to the first step for re-use in the formation of further amounts of solid alkylene diamine hydrobromide.

4. The cyclic process of producing alkylene diamines which comprises reacting an alkylene dibromide with ammonia to form a solid alkylene diamine hydrobromide, removing said solid diamine hydrobromide, treating said solid diamine hydrobromide with caustic soda in solution to free the diamine and to form bromide of sodium, distilling said diamine from the solution containing said bromide of sodium, bringing said solution at about 0° C. to about 4° C. into reaction contact with chlorine gas to liberate bromine and to form chloride of sodium, introducing an unsaturated aliphatic straight chain hydrocarbon into said solution containing said liberated bromine to produce an alkylene dibromide containing the same number of carbon atoms as is in the diamine produced in the first step hereof, and recovering and recycling said dibromide to the first step for re-use in the formation of further amounts of solid alkylene diamine hydrobromide.

5. The cyclic process of producing butylene diamines which comprises reacting a butylene dibromide with ammonia to form a solid butylene diamine hydrobromide, removing said solid diamine hydrobromide, treating said solid diamine hydrobromide with caustic soda in solution to free the said diamine and to form bromide of sodium, distilling the aforesaid to liberate the said diamine, bringing the solution containing said bromide of sodium into reaction contact with chlorine gas to liberate bromine and to form chloride of sodium, introducing a hydrocarbon vapor containing butylene of substantially the same constitution as that used in the first step hereof into said solution containing said liberated bromine to produce butylene dibromide, and recovering said dibromide for re-use in the formation of further amounts of solid butylene diamine hydrobromide.

6. The cyclic process of producing propylene diamines which comprises reacting a propylene dibromide with ammonia to form a solid propylene diamine hydrobromide, removing said solid diamine hydrobromide, treating said solid diamine hydrobromide with caustic soda in solution to free the said diamine and to form bromide of sodium, distilling the aforesaid to liberate the said diamine, bringing the solution containing said bromide of sodium into reaction contact with chlorine gas to liberate bromine and to form chloride of sodium, introducing a hydrocarbon vapor containing propylene of substantially the same constitution as that used in the first step hereof into said solution containing said liberated bromine to produce propylene dibromide, and recovering said dibromide for re-use in the formation of further amounts of solid propylene diamine hydrobromide.

MORRIS S. NAFASH.